US008173211B2

(12) United States Patent
Shaffer et al.

(10) Patent No.: US 8,173,211 B2
(45) Date of Patent: May 8, 2012

(54) CVD SYNTHESIS OF CARBON NANOTUBES

(75) Inventors: Milo Sebastian Peter Shaffer, London (GB); Alan H. Windle, Cambridge (GB); Brian F. G. Johnson, Cambridge (GB); Junfeng Geng, Cambridge (GB); Douglas Shephard, Yorkshire (GB); Charanjeet Singh, Durham (GB)

(73) Assignee: Cambridge University Technical Services Limited, Cambridge (GB)

( * ) Notice: Subject to any disclaimer, the term of this patent is extended or adjusted under 35 U.S.C. 154(b) by 666 days.

(21) Appl. No.: 10/521,356

(22) PCT Filed: Jul. 16, 2003

(86) PCT No.: PCT/GB03/03086
§ 371 (c)(1),
(2), (4) Date: Aug. 8, 2005

(87) PCT Pub. No.: WO2004/007362
PCT Pub. Date: Jan. 22, 2004

(65) Prior Publication Data
US 2006/0104884 A1    May 18, 2006

(30) Foreign Application Priority Data
Jul. 17, 2002 (GB) .................................. 0216654.4

(51) Int. Cl.
*B05D 3/02* (2006.01)
*B05D 7/00* (2006.01)
(52) U.S. Cl. ...................... 427/227; 427/228; 427/213
(58) Field of Classification Search .................. 427/213, 427/227, 228
See application file for complete search history.

(56) References Cited

U.S. PATENT DOCUMENTS

| 3,068,290 A | * | 12/1962 | Lichtenberger et al. | ....... 564/480 |
| 5,165,909 A | * | 11/1992 | Tennent et al. | ............. 423/447.3 |
| 5,500,200 A | * | 3/1996 | Mandeville et al. | ........ 423/447.3 |
| 5,578,543 A | * | 11/1996 | Tennent et al. | ............... 502/180 |
| 5,973,444 A | * | 10/1999 | Xu et al. | ........................ 313/309 |
| 5,997,832 A | * | 12/1999 | Lieber et al. | ................... 423/249 |
| 6,261,532 B1 | * | 7/2001 | Ono | ........................... 423/447.3 |
| 6,290,775 B1 | * | 9/2001 | Kohlen et al. | ................. 118/303 |
| 6,333,016 B1 | * | 12/2001 | Resasco et al. | ............. 423/447.3 |

(Continued)

FOREIGN PATENT DOCUMENTS

DE      100 43 891 A1     4/2002

(Continued)

OTHER PUBLICATIONS

Unger, DE 10043891 (translated abstract), 2002.*

(Continued)

*Primary Examiner* — Michael Cleveland
*Assistant Examiner* — Robert Vetere
(74) *Attorney, Agent, or Firm* — Pillsbury Winthrop Shaw Pittman LLP

(57) ABSTRACT

A method of production of carbon nanoparticles comprises the steps of: providing on substrate particles a transition metal compound which is decomposable to yield the transition metal under conditions permitting carbon nanoparticle formation, contacting a gaseous carbon source with the substrate particles, before, during or after said contacting step, decomposing the transition metal compound to yield the transition metal on the substrate particles, forming carbon nanoparticles by decomposition of the carbon source catalysed by the transition metal, and collecting the carbon nanoparticles formed.

15 Claims, 3 Drawing Sheets a)

b)

U.S. PATENT DOCUMENTS

| | | | | |
|---|---|---|---|---|
| 6,955,800 | B2 * | 10/2005 | Resasco et al. | 423/447.3 |
| 2003/0086859 | A1 * | 5/2003 | Kawakami et al. | 423/447.1 |

FOREIGN PATENT DOCUMENTS

| | | | |
|---|---|---|---|
| WO | 00/17102 | A1 | 3/2000 |
| WO | WO 00/17102 | | 3/2000 |
| WO | 00/26138 | A1 | 5/2000 |
| WO | WO 00/26138 | | 5/2000 |
| WO | 00/73205 | A1 | 12/2000 |
| WO | WO 00/73205 | A1 | 12/2000 |
| WO | 01/49599 | A2 | 7/2001 |
| WO | 01/94260 | A1 | 12/2001 |

OTHER PUBLICATIONS

Weidenkaff et al., "Metal nanoparticles for the production of carbon nanotube composite materials by decomposition of different carbon sources," Materials Science and Engerineering C, vol. 19, pp. 119-123, 2002 (available online Jan. 2, 2002).*

Kroto et al., C60: Buckminsterfullerene, Nature, vol. 318, Nov. 14, 1985, pp. 162-163, Nature Publishing Group.

Ijima, Helical Microtubules of Graphitic Carbon, Nature, vol. 354, Nov. 7, 1991, pp. 56-58, Nature Publishing Group.

Kratschmer et al., Solid C60: A New Form of Carbon, Nature, vol. 347, Sep. 27, 1990, pp. 354-358, Nature Publishing Group.

Alvarez et al., Synergism of Co and Mo in the Catalytic Production of Single-wall Carbon Nanotubes by Decomposition of CO, Carbon 39 (2001), pp. 547-558, Elsevier Science Ltd.

Shephard et al., Preparation, Characterisation and Performance of Encapsulated Copper-Ruthenium Bimetallic Catalysts Derived from Molecular Cluster Carbonyl Precursors, Chemistry Eur. Journal, vol. 4, No. 7, 1998, pp. 1214-1224.

Shephard et al., Site-Directed Surface Derivatisation of MCM-41: Use of High Resolution Transmission Electron Microscopy and Molecular Recognition for Determining the Position of Functionality within Mesoporous Materials, Angew. Chem. Int. Ed., vol. 37, No. 19, 1998, pp. 2719-2723.

Raja et al., Preparation and Characterisation of a Highly Active Bimetallic (Pd-Ru) Nanoparticle Heterogeneous Catalyst, Chem. Commun., 1999, pp. 1571-1572.

Zhou et al., Ordering of Ruthenium Cluster Carbonyls in Mesoporous Silica, Science, vol. 280, May 1, 1998, pp. 705-708.

Rohmund et al., A Simple Method for the Production of Large Arrays of Aligned Carbon Nanotubes, Chemical Physics Letters, vol. 328, Oct. 6, 2000, pp. 369-373.

Hafner et al., Catalytic Growth of Single-wall Carbon Nanotubes from Metal Particles, Chemical Physics Letters, vol. 296, Oct. 30, 1998, pp. 195-202.

Ivanov et al., Catalytic Production and Purification of Nanotubes Having Fullerene-scale Diameters, Carbon, vol. 33, No. 12, 1995, pp. 1727-1738, Elsevier Science Ltd.

Japanese Office Action for Japanese Patent Application No. 2004-520895, mailed on Aug. 31, 2010.

* cited by examiner a) b)

a) b)

CVD SYNTHESIS OF CARBON NANOTUBES

CROSS REFERENCE TO RELATED APPLICATION

This is the U.S. National Stage of PCT/GB2003/003086, filed Jul. 16, 2003, which in turn claims priority to Great Britain Application No. 0216654.4, filed Jul. 17, 2002, both of which are incorporated herein in their entirety by reference.

The present invention relates to methods of synthesis of carbon nanoparticles, and to the carbon nanoparticles thus produced.

Carbon nanoparticles have received a great deal of attention since the discovery of the $C_{60}$ buckminsterfullerene molecule (H. W. Kroto, J. R. Heath, S. C. O'Brien, R. F. Curl and R. E. Smally, Nature 318, 162 (1985)) and the carbon nanotube (S. Ijima, Nature 354, 56 (1991)). Carbon nanoparticles are typically 1 to 100 nm in at least one dimension, carbon nanotubes however being up to a few millimeters in length. The explosion in $C_{60}$ research in the early 1990s was driven by the production of large quantities (few milligrams) of the material by Krastchmer et al. (W. Kratschmer, L. D. Lamb, K. Fostiropoulos and D. R. Huffman, Nature 347, 354 (1990)) using a high pressure arc discharge method.

The remarkable mechanical and electronic properties exhibited by carbon nanotubes have encouraged efforts to develop mass production techniques. As a result, carbon nanotubes are becoming increasingly available, and more attention from both academia and industry is focused on the application of carbon nanotubes in bulk quantities. These opportunites include the use of carbon nanotubes as a conductive filler in insulating polymer matrices, and as reinforcement in structural materials. Other potential applications exploit the size of carbon nanotubes as a template to grow nano-sized, and hence ultra-high surface-to-volume ratio, catalysts or aim to combine carbon nanotubes to form nanoelectronic elements.

The high cost and low production volume of carbon nanotubes are at present prohibitive for them to be used as a filler material in most large-scale structural and electrical applications. Presently, several industrial and governmental projects are underway to mass produce several kilograms of single and multi-walled carbon nanotubes in a cost-effective manner. For example, the National Institute of Materials and Chemical Research (NIMCR) and Showa Denko K. K. in Japan recently announced a project to develop a mass-production method to produce several hundred kilograms of nanotubes per day.

Carbon nanotubes have been produced previously using various approaches including the laser or arc-discharge ablation of a carbon/catalyst mixture target.

For larger scale synthesis, the most promising methods have been based on chemical vapour deposition (CVD). CVD typically uses a cheap feedstock and has relatively low energy requirements, and has therefore attracted interest for the purposes of bulk synthesis. In CVD methods, a carbon containing gas is decomposed at high temperatures under the influence of a finely divided catalyst (usually iron, nickel, cobalt or other transition metals or-alloys).

Catalyst particles may be manufactured in situ by the decomposition of metalloorganic compounds or may be inserted into the CVD furnace on a fixed substrate (W. E. Alvarez et al., Carbon 39 (2001) 547-558; WO00/17102; WO00/73205). For the growth of small nanotubes and single-walled nanotubes in particular, very small metal clusters (around 1 nm) are required.

The catalyst may be in the form of a fragmented surface layer on a porous or non-porous macroscopic substrate (Ren et al., Bower et al., V I Merkulov, D H Lowndes, Y Y Wei et al., Andrews et al., and Cui et al.). As described in Kanzow et al, the catalyst may be a laser ablated nickel target exposed to a flow of reactant gas.

Alternatively, the catalyst may be in finely divided form. In WO00/17102, the catalyst is constituted by nanometer sized metal particles supported on larger (10-20 nm) alumina particles. The particles are placed in the centre of a furnace and the carbon containing gas is passed over them.

In WO00/73205, catalyst particles comprising two different metals supported on silica, alumina, magnesia, zirconia or zeolite are used, again placed in a tube within a furnace. It is also suggested that the metallic catalytic particles may be continuously fed to the furnace.

Many catalyst precursors known in the art are initially contaminated with carbon-containing surfactants (e.g. Pluronic 123™) derived from precursor solutions. Carbon is removed by calcination at elevated temperatures (typically around 500° C.) in air, to produce an oxide. Alternatively, oxides or other inorganic salts which decompose to oxides (e.g. nitrates and carbonates) are used directly as catalyst precursors. In either case, it is then usual to reduce the oxide to the metal in a further step (typically 700° C. in hydrogen).

In WO00/26138, catalyst nanoparticles are continuously produced within a furnace in the presence of reactant gas by decomposing a gaseous catalyst precursor (normally $Fe(CO)_5$) in the presence of a 'nucleation agency'. This may be a laser which provides some or all of the energy needed for photolysis of the catalyst precursor, or it may be a precursor moiety that stimulates clustering of catalyst atoms by decomposing more rapidly or binding to itself more strongly after dissociation. Typically, this is $Ni(CO)_4$.

A continuing problem in this art is the control over the extent of the production of multi-walled nanotubes in preference to single walled nanotubes and the control of the diameter of the tubes. In CVD synthesis, fine structures, such as single walled nanotubes require very fine catalyst particles with diameters similar to that of the synthesised material (typically about 1 nm). Maintaining the required catalyst particle size generally requires the use of a substrate to act as a carrier material to stabilise the catalyst itself. However, the production of very fine supported catalyst particles prior to use in the nanotube synthesis is generally complex and expensive involving for example aggressive reagents and supercritical drying. Substantial problems arise in preventing nanoparticles from coalescing prematurely and the synthesis of such particles is not suitable for scaled-up production.

The production of catalyst particles in situ in the reaction zone as in WO00/26138, where the catalyst particles are essentially unsupported, or where the nucleation of catalyst clusters is enhanced by the presence of Ni species suffers from a lack of particle size control. Since the particles are growing, the time at which they initiate nanotube growth may be critical.

Because the nucleation sites are formed in situ from individual Ni atoms and comprise only a few atoms (2 to 5 atoms) in total, the process offers little control over the size of the nucleating "particle", or of the size of the final catalyst clusters. There is no controlled templating of the catalyst by the structure of the substrate.

In a first aspect, the present invention provides a method of production of carbon nanoparticles, comprising the steps of:

providing on substrate particles a transition metal compound which is decomposable to yield the transition metal under conditions permitting carbon nanoparticle formation;

contacting a gaseous carbon source with the substrate particles;

before, during or after the contacting step, decomposing the transition metal compound to yield the transition metal on the substrate particles and forming carbon nanoparticles by decomposition of the carbon source catalysed by the transition metal;

and collecting the carbon nanoparticles formed.

The transition metal compound may contain more than one metallic element. Alternatively or additionally, a mixture of transition metal compounds may be used, and in this case the different transition metal compounds may contain different metallic elements.

Preferably, the transition metal compound is a transition metal salt. More preferably, the transition metal salt is a transition metal formate or oxalate.

The transition metal compound may be a transition metal carbonyl, more preferably a multi metal atom carbonyl. The transition metal carbonyls is preferably non-volatile, in the sense that it does not evaporate or sublime before decomposition takes place. The transition metal carbonyl may be a neutral compound or a salt. Preferred multi metal atom carbonyls contain from 13 to 55 metal atoms, for example a $Ni_{38}$ carbonyl cluster. Suitable transition metal carbonyls for use in the invention may be made by the methods described in "Preparation, Characterisation and Performance of Encapsulated Copper-Ruthenium Bimetallic Catalysts Derived from Molecular Cluster Carbonyl Precursors." D. S. Shephard, T. Maschmeyer, G. Sankar, J. M. Thomas, D. Ozkaya, B. F. G. Johnson, R. Raya, R. D. Oldroyd, R. G. Bell, Chemistry Eu. J., 1998, 4, 1227; "Site-Directed Surface Derivatisation of MCM-41: Use of HRTEM and Molecular Recognition for Determining the Position of Functionality within Mesoporous Materials." D. S. Shephard, W. Zhou, T. Maschmeyer, J. M. Matters, C. L. Roper, S. Parsons, B. F. G. Johnson, M. J. Juer, Angew. Chem. Int. Ed., 1998, 37, 2718; "Preparation and Characterisation of a Highly Active Bimetallic (Pd—Ru) Nanoparticle Heterogeneous Catalyst." D. S. Shephard, R. Raja, G. Sankar, S. Hermans, S. Bromley, J. M. Thomas, B. F. G. Johnson, Chem. Comm. 1999, 1571; and "Supramolecular ordering of Ruthenium Cluster Carbonyls in Mesoporous Silica." W. Zhou, D. S. Shephard, J. M. Thomas, T. Maschmeyer, B. F. G. Johnson, R. G. Bell, Science, 1998, 280, 705.

Preferably, the transition metal is nickel, iron or cobalt.

Unlike the metal nitrates and similar salts used in the past, transition metal compounds used in this invention such as formats or oxalates are decomposable to the metal by heating without reduction, e.g. under a non-reducing atmosphere.

Suitable carbon-containing compounds for use as the carbon source include carbon monoxide and hydrocarbons, including aromatic hydrocarbons, e.g. benzene, toluene, xylene, cumene, ethylbenzene, naphthalene, non-aromatic hydrocarbons, e.g. methane, ethane, propane, butane, pentane, hexane, cyclohexane, ethylene, propylene or acetylene, and oxygen-containing hydrocarbons, e.g. formaldehyde, acetaldehyde, acetone, methanol or ethanol, or a mixture of two or more thereof. In preferred embodiments, the carbon-containing compound is carbon monoxide (CO), methane, ethylene or acetylene.

Preferably, the gaseous carbon source is passed over the substrate particles.

The carbon source may be mixed with one or more gases acting as a diluent such as inert gases, e.g. argon. The carbon source may also be mixed with non carbon containing gases which play no direct role in the nanotube forming reaction but which play a contributory role, for instance by reacting with amorphous carbon as it is formed (as a by-product) and so keeping the reaction sites on the catalyst clean and available for nanotube formation.

Gases which may be mixed with the carbon source include argon, hydrogen, nitrogen, ammonia, carbon dioxide or helium.

Preferred gas pressures for the gaseous carbon source and optional diluent are from 0.1 to 50 bar A, preferably from 0.5 to 5 bar A, more preferably 1 to 2 bar A. The gaseous effluent from the furnace may be recycled, with or without clean up.

The substrate particles are preferably a suspended finely divided substrate material. In the most straightforward case, the substrate particles are simply finely ground powders, for example oxides particles or silicate particles such as silica, alumina, $CaSiO_x$, calcium oxide and/or magnesium oxide. Finer materials such as gels and aerogels may be generated by a range of methods known to those skilled in the art, such as fuming, colloidal processing, spray-drying, hydrothermal processing and so on. Particular benefit for the production of nanotubes may be derived by using structured substrate particles, particularly mesoporous silicas, anodised alumina membranes, or zeolites. These materials have channels of similar dimensions to nanotubes, and can further guide both the deposition of catalyst and synthesis of nanotubes.

The finely divided substrate particles preferably have a size not smaller than 1 nm, e.g. not less than 5 nm. They may contain not less than 10 atoms, e.g. not less than 15 to 20 atoms, perhaps not less than 50 atoms or 75 atoms.

Preferably, the transition metal compound is decomposed by heating, for example by heating to a temperature between 200° C. and 1000° C., more preferably between 600° C. and 1000° C. To stimulate decomposition of the catalyst precursor material, an additional energy source (over and above the temperature of the furnace) may be locally applied. The source must be able to penetrate the loaded substrate powder. Such a source is preferably an intense light source, for example a laser or an intense non-coherent light source such as a flash discharge lamp. Preferably, the light source is an ultraviolet light source. Alternatively, the additional energy source may be a plasma discharge or an arc discharge formed in the presence of the catalyst precursor material.

Preferably, the carbon nanoparticles are carbon nanotubes. More preferably, the carbon nanotubes are single walled carbon nanotubes.

Preferably, the method further comprises the initial step of impregnating the substrate particles with the transition metal compound. More preferably, where a transition metal salt is used, impregnation is achieved using a solution of the transition metal salt.

Preferably, the method is continuous. In this case, the method may comprise the steps of:

continuously providing substrate particles;

fluidising the substrate particles with a flow of gaseous carbon source;

heating the transition metal compound on the substrate particles; and collecting the carbon nanoparticles formed by elution.

Alternatively, the method may comprise the steps of:

continuously providing substrate particles to an upper part of an inclined surface;

contacting the substrate particles on the inclined surface with a flow of gaseous carbon source;

heating the transition metal compound on the substrate particles; and collecting carbon nanoparticles formed from a lower part of the inclined surface.

In a second aspect, the second invention relates to a method of production of carbon nanoparticles, comprising the steps of:

providing on substrate particles a transition metal oxalate, formate or multi metal atom carbonyl;

heating the transition metal oxalate, formate or multi metal atom carbonyl on the substrate particles;

contacting a gaseous carbon source with the substrate particles; and collecting the carbon nanoparticles formed.

The features described in connection with the first aspect of the invention may also be used in connection with the second aspect of the invention. In a particularly preferred embodiment of the second aspect of the invention, the transition metal oxalate, formate or multi metal atom carbonyl is nickel formate and the substrate particles comprise silica.

In a third aspect, the present invention relates to carbon nanoparticles formed by a method as described above.

The invention will be further illustrated by the following non-limiting examples, with references to the drawings, in which.

APPARATUS

Figure 1:
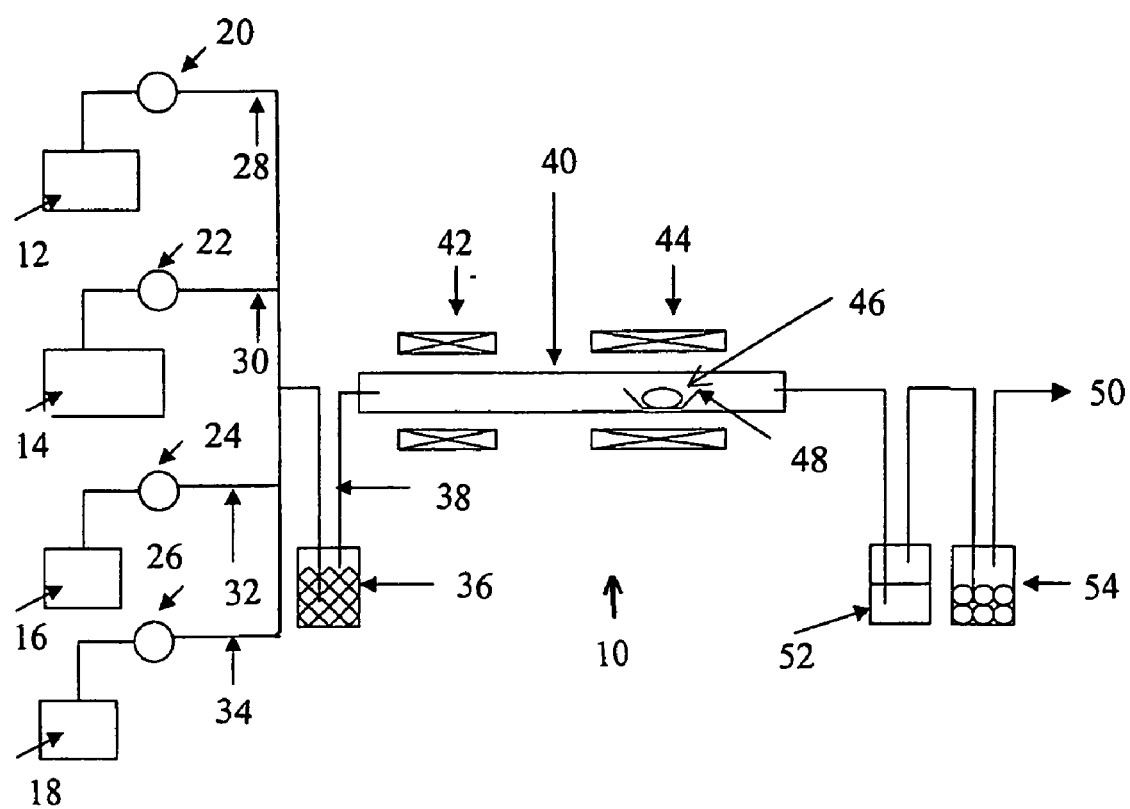
FIG. 1 shows the apparatus used in Examples 1, 3 4 and 6.

The apparatus 10 used in Examples 1, 3, 4 and 6 for the growth of carbon nanotubes is shown in FIG. 1. The apparatus 10 comprises sources of argon 12, acetylene 14, hydrogen 16 and methane 18, connected to flow meters 20, 22, 24 and 26 respectively. Supply pipes 28, 30, 32 and 34 lead from sources 12, 14, 16 and 18 into a drying container 36 containing calcium chloride. The outlet 38 of the drying container 36 is connected to a horizontal furnace 40 with heating elements 42, 44. Catalyst 46 contained in an alumina crucible 48 is positioned in the furnace 40 aligned with the heating element 44. The outlet 50 of the furnace passes through a paraffin bubbler 52 and a beaker 54 containing activated carbon.

In Example 2, a modified version of the apparatus 10 of FIG. 1 is used, wherein the furnace 40 is replaced by a quartz tube (not shown).

EXAMPLE 1

Figure 2:
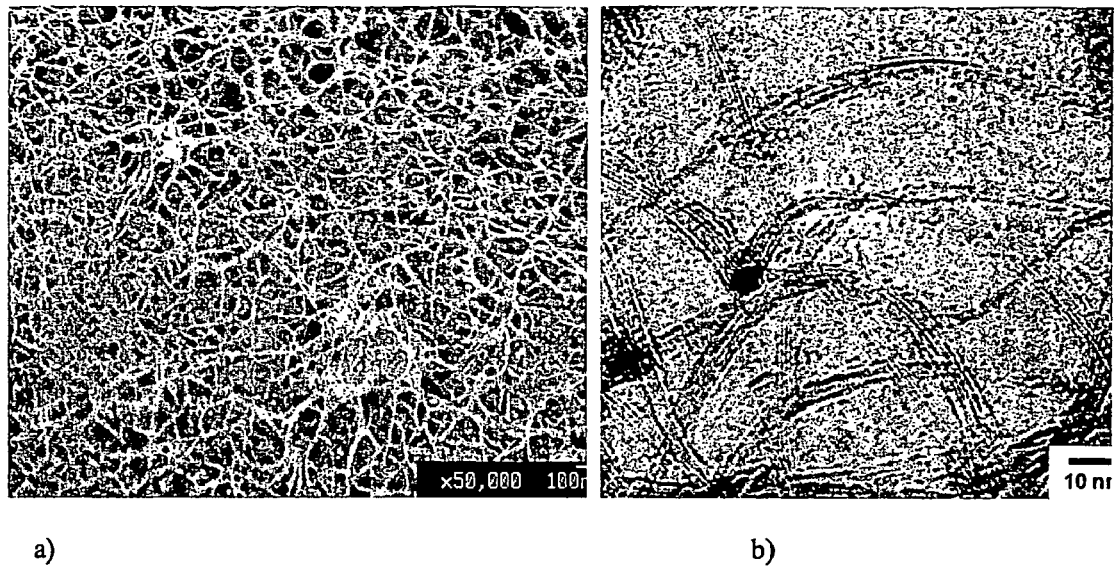
FIG. 2 shows the product of Example 1:
a) SEM image
b) HRTEM image.

100 mg of silica powder (fumed silica from Aldrich Chemical Company, surface area 200 m$^2$/g) was placed in a flask. To this was added 4.0 ml of aqueous nickel formate ($1.09 \times 10^{-2}$ M). The mixture was strongly stirred at room temperature for 30 minutes, then dried in an oven at 90° C. for 16 hours. The sample prepared in this way contained 2.5 wt % nickel loading relative to the silica support. The sample was ground gently by hand in an agate mortar to produce a uniform powder before introducing into the CVD furnace 40 (FIG. 1) in an alumina crucible 48 for the growth of CNTs. The growth of CNTs was performed using an argon-methane atmosphere (1:1 argon to methane) with a total gas flow rate of 400 ml/minute. The temperature was 860° C. After 30 minutes the products were characterised by scanning electron microscopy (SEM), high resolution transmission electron microscopy (HRTEM), and Raman spectroscopy. FIG. 2 shows the SEM and HRTEM images of the nanotubes. The nanotubes were clean, pure singlewalled and almost monodisperse, with a diameter of about 1.0 nm. The nanotubes were mainly in the form of small bundles although some individual nanotubes were observed.

EXAMPLE 2

Figure 3:
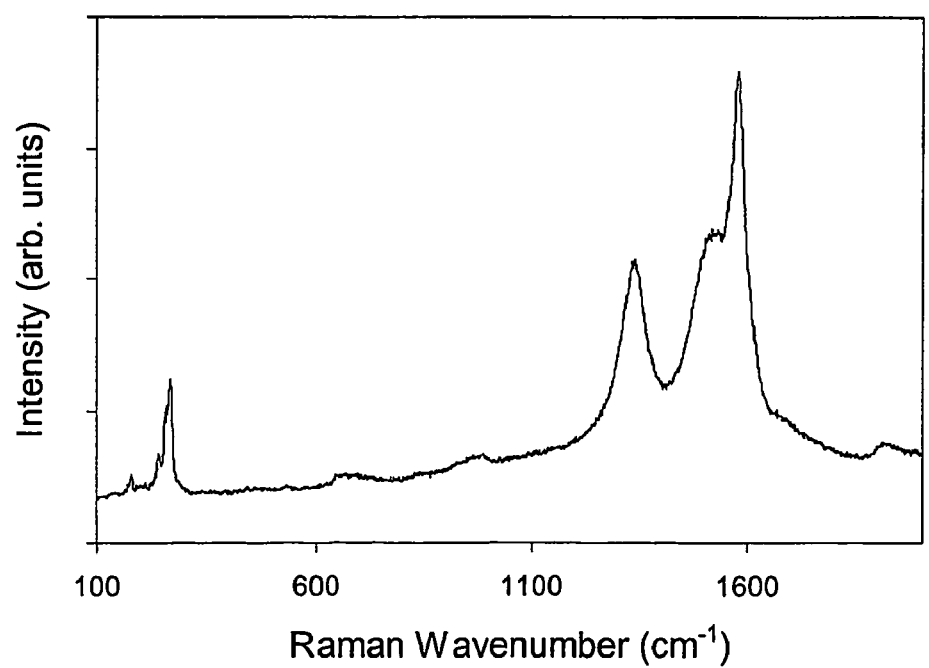
FIG. 3 shows a Raman spectrum of the product of Example 2.

500 mg silica powder (fumed silica from Aldrich Chemical Company, surface area 200 m$^2$/g) was placed in a 100 ml beaker. To this was added 25 ml aqueous nickel formate ($1.08 \times 10^{-2}$ M). The mixture was strongly stirred at room temperature for 30 minutes, followed by further stirring at higher temperature (90° C.) for about 20 hours to dry the sample. The metal loading in the prepared sample was 3.2 wt % relative to the silica support. For nanotube growth, 26.49 mg of the sample was placed in the centre of a quartz tube preheated to 860° C. under argon atmosphere. Methane was then immediately introduced (1:1 argon to methane volume ratio, total flow rate of 400 ml/min) to initiate the nanotube growth. After 30 minutes of reaction, 25.37 mg of product was obtained. Raman spectroscopy indicated that the nanotubes were single-walled and monodisperse (FIG. 3). The yield of the carbon nanotubes was 4.7%, based on the formula:

Yield %=$(m_1-m_0)/m_0 \times 100\%$ where: $m_1$ is mass of the catalyst powder after growth $m_0$ is mass of the catalyst powder after heating under identical conditions as for nanotube growth, except that no methane is introduced.

EXAMPLE 3

Figure 4:
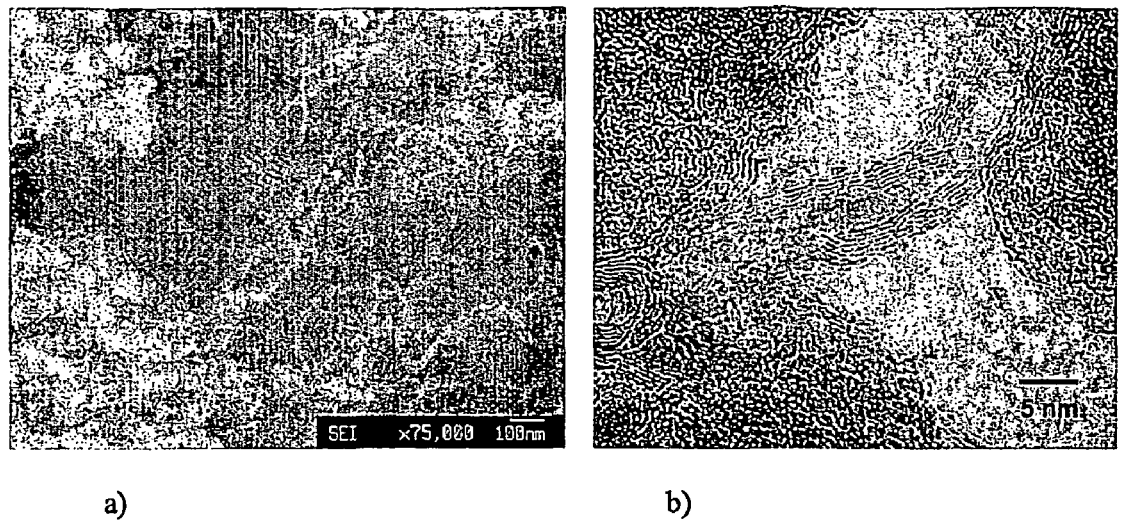
FIG. 4 shows the product of Example 3:
a) SEM image
b) HRTEM image.
Figure 5:
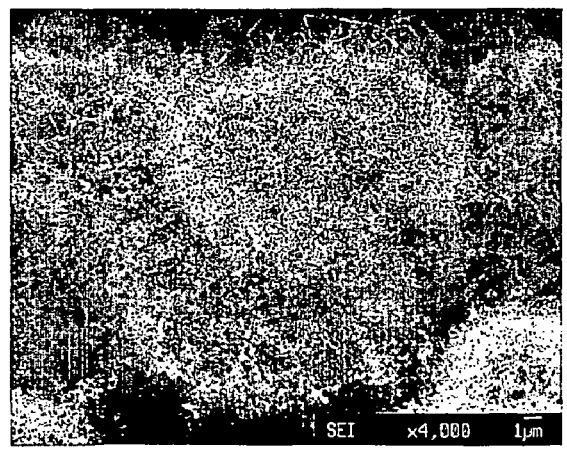
FIG. 5 shows the product of Example 4.

20 mg silica fine powder (fumed silica from Aldrich Chemical Company, surface area 200 m$^2$/g) was placed in a flask. To this was added 1.5 ml aqueous nickel formate ($3.8 \times 10^{-3}$ M) The mixture was strongly stirred at room temperature for 30 minutes, then dried in an over at 90° C. for 16 hours. The prepared sample contained 1.7 wt % nickel loading relative to the silica support. The sample was ground gently by hand in an agate mortar to produce a uniform powder before introduction into the CVD furnace 40 (FIG. 1) in an alumina crucible 48 for the growth of CNTs. The growth of CNTs was performed at 650° C. for 60 minutes using an acetylene and argon mixture (1:10 acetylene to argon). The total gas flow rate was 220 ml/minute. The products were characterised by SEM and HRTEM. FIG. 4 shows SEM and HRTEM images of the MWNTs produced. The diameters of the nanotubes produced were typically about 10 nm.

EXAMPLE 4

When hydrogen (5:5:1 ratio of argon to hydrogen to acetylene, total flow rate of 220 ml/min)was added to the gas stream of Example 3 during growth, high yields of MWNTs were obtained (FIG. 4). The diameters of the nanotubes were found to increase to about 22 nm.

EXAMPLE 5

Nickel 38 carbonyl cluster is prepared from smaller clusters by reaction in base or with a molecular template. For example, nickel 38 carbonyl cluster is prepared from nickel tetracarbonyl via nickel 6 carbonyl cluster as follows. Nickel tetracarbonyl (5 ml) and potassium hydroxide (13 g) in methanol were stirred for 24 h under nitrogen. The resulting deep red suspension was evaporated under vacuum and the residue was dissolved in water. Upon addition of solid potassium bromide (20 g) and further evaporation under vacuum to eliminate traces of methanol, red microcrystals of $K_2[Ni_6(CO)_{12}] \cdot xH_2O$ (nickel 6 carbonyl cluster) were obtained. To synthesise nickel 38 cluster, nickel 6 carbonyl cluster is treated with either platinum (II) chloride or $K_2PtCl_4$ in 1:1 molar ratio in acetonitrile. The $Ni_{38}Pt_6$ carbonyl cluster salt can be separated from impurities as a result of differential solubility in the solvent.

EXAMPLE 6

100 mg of silica powder (fumed silica from Aldrich Chemical Company, surface area 200 m²/g) is placed in a flask. To this is added 4.0 ml of dichloromethane dissolved nickel 38 carbonyl cluster ($1.09 \times 10^{-2}$ M). The mixture is strongly stirred at room temperature for 30 minutes, then dried in an oven at 90° C. for 16 hours. The sample is ground gently by hand in an agate mortar to produce a uniform powder before introducing into the CVD furnace 40 (FIG. 1) in an alumina crucible 48 for the growth of CNTs. The growth of CNTs is performed using an argon-methane atmosphere (1:1 argon to methane) with a total gas flow rate of 400 ml/minute. The temperature is 860° C. After 30 minutes the products are characterised by scanning electron microscopy (SEM), high resolution transmission electron microscopy (HRTEM), and Raman spectroscopy.

The one step process of the Examples is simple and cheap. The combinations of precursor and support particles used are particularly effective at producing high yields of pure nanotubes.

Whilst the applicant does not wish to be bound by this theory, it is believed that the precursor molecules are adsorbed onto the surface of the support particles. At high temperatures the transition metal salt precursor of Examples 1 to 4 thermally decomposes to produce metal nanoparticles of 1-3 nm diameter and gaseous side products. Such nanoparticles are chemically very active and serve as a catalyst for CNT growth. Transition metal carbonyl cluster precursors decompose by loss of the surface and connecting carbonyl ligands such that each cluster forms a metal nanoparticle. Each metal nanoparticle is of suitable size to nucleate an individual nanotube.

In general larger catalyst particles suppress single wall carbon nanotubes. Large catalyst particles are produced by sintering. This occurs if the catalyst is held at high temperature, particularly where there are high metal loadings or a smooth surface on which metal particles are mobile. Where sintering occurs, multi wall carbon nanotubes or encapsulated nanoparticles tend to be formed, probably depending on the size difference between the catalyst and the fundamental support particles. A strong attraction between substrate and catalyst favours nanotube growth. Temperatures which are too high lead to overcoating and production of multi wall carbon nanotubes, nanofibres or vapour grown carbon fibres. In the processes of the examples there is no need for additional heat treatment that can give rise to undesirable sintering effects.

The processes of the invention as illustrated above have several advantages over known CVD processes. First, in the processes of the Examples, there is no need for the usual calcination and reduction steps to produce the catalyst from the catalyst precursor. Secondly, water is used as the solvent in preparation of the catalyst precursors of Examples 1 to 4, and may also be used in the preparation of catalyst precursors from transition metal carbonyl salts. The use of water rather than organic solvents has cost and environmental benefits. Thirdly, the precursors of Examples 1 to 4 are particularly easy to handle and to introduce onto the substrate as a result of their solubility in water, stability, low volatility, low cost and low toxicity. By comparison, conventional precursors such as nickel tetracarbonyl are difficult to handle.

The process of Example 6 has the advantage that each transition metal carbonyl cluster forms a metal nanoparticle of defined size. This gives optimal control over nanotube diameter and may allow chirality control.

The process of the Examples can be used to produce high-quality, high yield SWCNTs on an industrial scale. The process may be scaled up in a number of ways. For example, a bed of supported catalyst may be fluidised using suitable carbon-containing gas and reacted product collected by elution due to its reduced effective density, whilst fresh supported catalyst precursor is continuously added. Alternatively, the supported catalyst precursor may be introduced to the top of a rotating, gently sloping cylindrical furnace tube and allowed to travel down the length of the heated furnace under a suitable atmosphere, growing nanotubes during the well-defined transit time. The quality of the nanotubes, in terms of diameter, length, ratio of SWNTs to MWNTs and amorphous carbon, can be controlled by controlling the catalyst loading, dispersion level in supports and the CVD growth parameters.

Although the invention has been described with reference to the Examples, it will be appreciated that various modifications are possible within the scope of the invention.

The invention claimed is:

1. A continuous method of production of carbon nanotubes, comprising:
   continuously providing substrate particles;
   providing on the substrate particles a transition metal compound that is a nickel, iron or cobalt formate which is decomposable to yield a transition metal catalyst under a non-reducing atmosphere permitting carbon nanotube formation;
   fluidizing the substrate particles with a flow of gaseous carbon source;
   heating the transition metal formate on the substrate particles;
   before, during or after contacting the gaseous carbon source with the substrate particles, decomposing the transition metal formate to yield the transition metal catalyst on the substrate particles by heating without the transition metal catalyst being reduced by the atmosphere;
   forming single walled carbon nanotubes by decomposition of the carbon source catalysed by the transition metal catalyst; and
   collecting the single walled carbon nanoparticles formed by elution.

2. A method as claimed in claim 1, wherein the gaseous carbon source is a hydrocarbon or carbon monoxide.

3. A method as claimed in claim 2, wherein the gaseous carbon source is methane or acetylene.

4. A method as claimed in claim 1, wherein the gaseous carbon source is passed over the substrate particles.

5. A method as claimed in claim 1, wherein the gaseous carbon source is mixed with a diluent.

6. A method as claimed in claim 5, wherein the diluent is argon.

7. A method as claimed in claim 1, wherein the substrate particles comprise oxide particles and/or silicate particles.

8. A method as claimed in claim 7, wherein the substrate particles comprise one or more of silica, alumina, $CaSiO_x$, calcium oxide or magnesium oxide.

9. A method as claimed in claim 1, wherein the substrate particles are in the form of a fumed powder, a colloid, a gel or an aerogel.

10. A method as claimed in claim 1, wherein the transition metal compound is decomposed by heating to a temperature between 200° C. and 1000° C.

11. A method as claimed in claim 10, wherein the transition metal compound is decomposed by heating to a temperature between 600° C. and 1000° C.

12. A method as claimed in claim 1, further comprising an initial step of impregnating the substrate particles with the transition metal compound.

13. A method as claimed in claim 1, comprising:
continuously providing substrate particles to an upper part of an inclined surface;
contacting the substrate particles on the inclined surface with a flow of gaseous carbon source;
heating the transition metal compound on the substrate particles; and
collecting single walled carbon nanotubes formed from a lower part of the inclined surface.

14. A method as claimed in claim 1, wherein
heating the transition metal compound on the substrate particles to decompose the transition metal compound to the transition metal catalyst occurs before contacting the substrate particles with the flow of gaseous carbon source.

15. A method as claimed in claim 14, wherein the transition metal compound is nickel formate and the substrate particles are silica particles.

* * * * *